Figure 1:
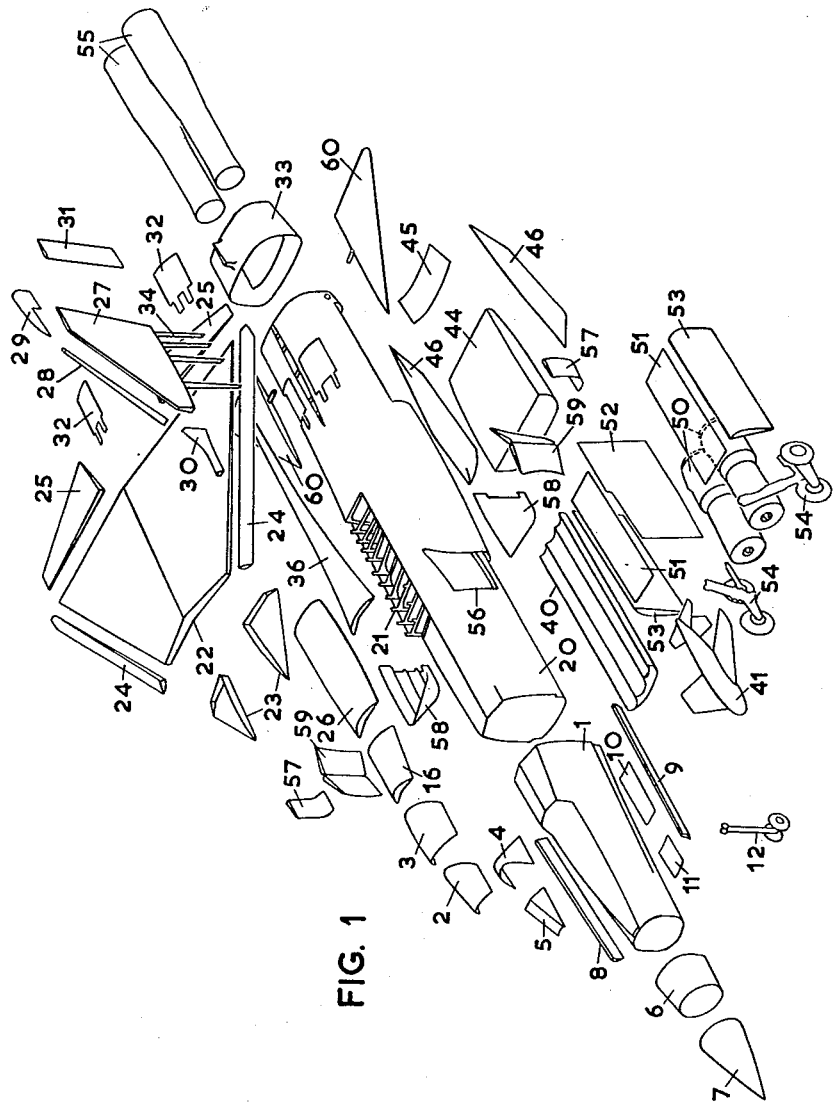

Aug. 29, 1961  R. F. CREASEY ET AL  2,998,209
MULTI-PURPOSE JET PROPELLED AIRCRAFT
Filed Sept. 25, 1959  2 Sheets-Sheet 1

Inventors:
Raymond Frederick Creasey
Bernard Oliver Heath
Geoffrey Francis Sharples
By: Stevens, Davis, Miller + Mosher
Attorneys Aug. 29, 1961   R. F. CREASEY ET AL   2,998,209
MULTI-PURPOSE JET PROPELLED AIRCRAFT
Filed Sept. 25, 1959   2 Sheets-Sheet 2

Inventors:
Raymond F. Creasey
Bernard O. Heath
Geoffrey F. Sharples
By: Stevens, Davis, Miller & Mosher
Attorneys United States Patent Office — 2,998,209 — Patented Aug. 29, 1961

2,998,209
MULTI-PURPOSE, JET PROPELLED AIRCRAFT
Raymond Frederick Creasey, Lytham St. Annes, Bernard Oliver Heath, Lea, near Preston, and Geoffrey Francis Sharples, Blackpool, England, assignors to The English Electric Company Limited, London, England, a British company
Filed Sept. 25, 1959, Ser. No. 842,473
Claims priority, application Great Britain Oct. 8, 1958
6 Claims. (Cl. 244—15)

This invention relates to multi-purpose aircraft.

Basically the performance of an aircraft is affected by its shape or configuration, size, weight, and engine power or thrust. Thus an aircraft with high thrust, small size, small weight and suitable shape may be designed to fly supersonically at high altitudes carrying a comparatively small load as in the case of a modern fighter. On the other hand, an aircraft of larger wing area and larger size may be used to fly slowly at lower altitudes carrying a heavy load as in the case of a bomber. In all cases it is desirable to have as short a take-off and landing distance as possible and to increase technical reliability for instance by the use of twin engines. In all cases a long endurance or range of operation is desirable.

The object of the present invention is to provide an aircraft suited both for use as a fighter and as a bomber, that is to say, having supersonic performance at altitude and the capability of low level bomber or attack performance at high speed with freedom from undue susceptibility to being affected by wind gusts together with good endurance or range, technical reliability, and short take-off and landing distance.

In accordance with the invention, these objects are achieved by providing the aircraft with twin engines of ample power to give the supersonic and take-off performance and still to give adequate range at cruise in spite of being then throttled back. The engines are placed towards the rear of and within the fuselage with jet pipes above and between the halves of an all-moving tail plane to avoid jet interference with tailplane surfaces, and in positions near the centre line of the fuselage so as to avoid undue thrust asymmetry when flying on a single engine. The aircraft services and performance are arranged so that the aircraft will fly safely on a single engine.

In accordance with the invention a thin delta wing is used mounted high on the fuselage with a large blown flap provided along the whole free length of its trailing edge. This combination of wing, blown flaps and ample engine power provides adequate lift for short take-off and landing performance without undue reduction in engine thrust since only a modicum of blowing air is required. The delta wing plan form also enables a medium wing loading to be used giving supersonic manoeuverability at high altitude without unduly affecting the take-off and landing performances stated hereinabove. Moreover the low lift slope inherent to a delta wing gives an acceptable level of gust response even with the medium wing loading mentioned. Further, having a centre of pressure towards the rear of the wing enables the aircraft's centre of gravity to be located at the forward end of the twin engines so that the undercarriage may be positioned underneath the engine bay. The convenient space forward of the centre of gravity for fuel tanks above the armaments bay and a space for fuel tanks below the rear jet pipe allow for use of intercommunicating fuel tanks which give a balance in pitch at all fuel states. Owing to its wing plan form the aircraft is less susceptible to movement by wind gusts than is a high aspect ratio rectangular wing, and also the wing structure may be thinner and therefore suited to supersonic flying without weight penalty. Over the fuselage the wing skin is arranged to take not only its own loads but also the longitudinal fuselage stresses so as to form a lighter integrated stressed structure.

In accordance with the invention, instead of ailerons the normal place of which is occupied by the blown flaps extending over the whole free trailing edge of the wing, port and starboard tailplane halves are provided at the rear of the fuselage which may be operated differentially for roll control, and in unison for pitch control.

Side by side location of the engines and jet pipes enables the spars for the aircraft fin to be taken right down through the fuselage and provide additional bracing for the fuselage frames at the tail end with weight saving and superior fatigue life.

The relative positions of the engines and the delta wing together with the plan form of that wing enables the engine air intake to emerge from the side of the fuselage underneath the delta wing so as to smooth out the upward flow of air across the intake mouth when the aircraft is flying at nose up incidence, a sufficient length of diffuser duct being placed between the engine proper and the intake mouth at the fuselage.

Figure 2:
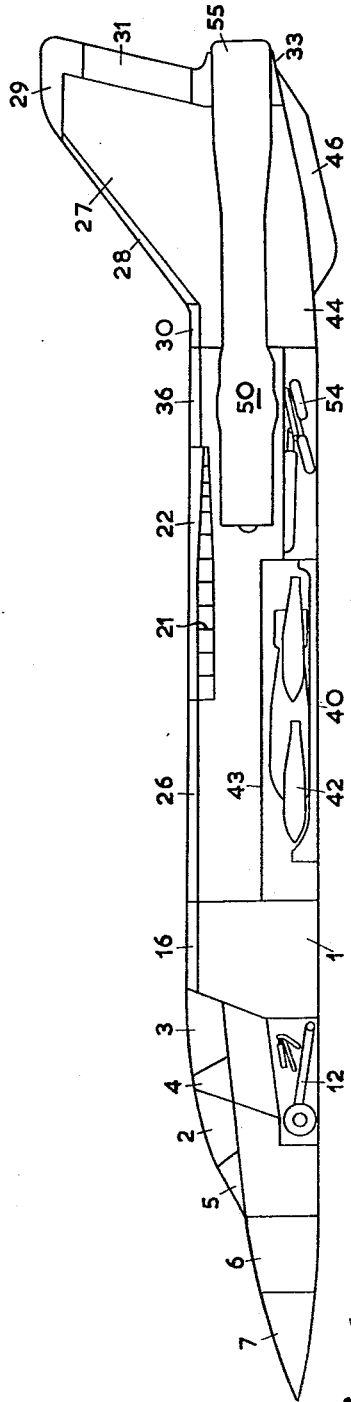

In order that the invention may be clearly understood and readily carried into effect, an embodiment thereof will now be described by way of example with reference to the accompanying drawings, in which:

FIG. 1 is a diagrammatic exploded perspective view of an aircraft according to the invention, and FIG. 2 is a longitudinal section of the fuselage thereof.

The aircraft is composed of the front fuselage 1 containing the pilot's and the navigator's cockpits covered by canopies 2 and 3, respectively, which alternatively may be in one piece but are separated in the present embodiment by an arch 4 fixedly connected to the front fuselage 1. The pilot's cockpit is closed in front by a windscreen 5. The front fuselage 1 has in front a hinged bay 6 and a radome 7 attached to it in succession, and has a starboard duct cover 8, a port equipment supply duct cover 9 on the sides and an access door 10 and nose undercarriage door 11 at the bottom. The twin wheel nose undercarriage 12 can retract forward into the bottom of the front fuselage 1 (FIG. 2).

The front fuselage 1 is joined to the centre fuselage 20 carrying on its back, by means of frames 21, the delta-shaped main wing 22 having on starboard and port, respectively, an apex 23, a leading edge 24, and a full span flap 25. The upper skin of the delta wing 22 is integrated at the frames 21 into the centre fuselage 20 as a load carrying member, thus allowing substantial savings in weight. A front spine 16 and centre spine 26 cover the rear top of the front fuselage 1 and front top of the centre fuselage 20, respectively, to provide a smooth continuation from the navigator's canopy to the wing apices. A fin 27 having a fin leading edge 28 fin tip 29 and fairing 30 has its spars 34 taken right through the centre fuselage 20 where they provide additional bracing to the fuselage frames at the tail end thereof. A rudder 31 is hinged at the trailing edge of the fin 27. The rear of the centre fuselage 20 has cut outs covered by a starboard and port panel 32 respectively, on both sides of the fin 27. The centre fuselage 20 has a rear fairing 33 attached to its rear end. A rear spine 36 covers the top of the centre fuselage 20 and the centre of wing 22.

A bay at the bottom of the forward portion of the centre fuselage 20 is closed by a rotary armament door 40 to which a weapon 41 (FIG. 1) or bombs 42 (FIG. 2) may be attached. A forward integral fuel tank 43 (FIG. 2) is built into the centre fuselage 20 above the said bay.

Two turbo-jet engines 50 are built-in side by side into a bay at the rear portion of the centre fuselage under a starboard and port engine floor 51, respectively, and separated from one another by a vertical engine firewall 52. The engine bay can be closed by the starboard and port undercarriage doors 53. The main undercarriage 54 is arranged to retract rearward into the said bay below the jet engines 50 (FIG. 2) but leaving enough space between its two legs (FIG. 1) to allow for removal of the engines from the centre fuselage 20 while the aircraft rests on its undercarriage. The main undercarriage legs are provided with wheels in tandem arrangement. The two jet engines 50 issue their propulsive jets into jet pipes 55 housed in the rear portion of the centre fuselage 20 from which they can be extracted longitudinally.

At the sides of the centre fuselage 20 two air intake mouths 56 are provided under the roots of the delta wing 22 whereby the flow of air to these intake mouths at high angles of incidence is smoothed out by the said wing. Starboard and port intake lips 57 flank these air intake mouths 56 from outside, while starboard and port splitter plates 58 and starboard and port intake ramps 59 guide the air inside the centre fuselage 20 from the air intake mouths 56 to the inlets of the turbo-jet propulsion engines 50.

Another integral fuel tank 44 is built into the rear end of centre fuselage 20 aft of the engine and main fuselage bay (FIG. 2).

A brake parachute door 45 is provided at the bottom of the rear fairing 33 (FIG. 1), and starboard and port ventral fins 46 are attached under the bottom of said rear fairing 33 and of the rear portion of the centre fuselage 20. A starboard and a port tailplane 60 are hinged about a transverse horizontal axis in the rear end of the centre fuselage 20, for independent operation, which is in unison for use as an elevator, and differentially for control of the aircraft in roll i.e. with the effect of ailerons which are not provided in this aircraft in view of the flaps 25 occupying the entire free span of the trailing edge of the delta wing 22.

The turning movement of the roots of the tailplanes 60 takes place along the outside of the said ventral fins 46, thus obviating the formation of gaps between the tailplanes 60 and the centre fuselage 20.

At the hinge line of the flaps 25 there is provided a compressed air tube (not shown) which is connectable under the pilot's control to the compressors of the turbo-jet propulsion engines 50, to allow "blowing" these flaps over the entire span for increasing the lift when taking off or landing, thus ensuring short runs.

The arrangement of the two built-in fuel tanks 43 and 44 fore and aft of the centre of gravity of the aircraft located at the forward end of the engines 50 keeps change of trim owing to using up the fuel to a minimum.

In addition to improving the airflow at the roots of the tailplanes 60, the ventral fins 46 may serve also as lateral abutments for a brake parachute cable, and as rear bumpers for the fuselage in case of a tail down landing. They are appropriately reinforced, and are easily exchangeable in case of their being damaged.

A couple of rocket motors (not shown) may be built into the rear end of the main undercarriage bay in such a position that their axes converge in plane, and are inclined in elevation, in such a manner as to pass through the centre of gravity of the aircraft.

What we claim as our invention and desire to secure by Letters Patent is:

1. A multi-purpose aircraft capable of supersonic flight at high altitude and of high load carrying capacity at high subsonic speed at low altitude, comprising in combination: a fuselage, a thin profile delta wing mounted on top of the said fuselage and having large blown flaps along the whole free length of its trailing edge, an all-moving two-part tailplane fitted to the said fuselage, and twin jet propulsion engines having jet pipes mounted closely parallel to one another within the rear portion of the said fuselage near the centre line of the latter, the said jet pipes lying betwen and above the said two parts of the said all-moving tailplane.

2. A multi-purpose aircraft as claimed in claim 1, having its centre of gravity located at the forward end of the said twin engines, the centre of pressure of the said delta wing lying towards the rear of said wing.

3. A multi-purpose aircraft as claimed in claim 1, having control means for the differential operation of the said two parts of the said all-moving tailplane for roll control, and for operation thereof in unison for pitch control.

4. A multi-purpose aircraft as claimed in claim 1, having air intakes to the said engines and diffuser ducts inside said fuselage connecting the said intakes to the inlets of the said jet propulsion engines, the said intakes being arranged at the sides of the said fuselage under the said delta wings.

5. A multi-purpose aircraft as claimed in claim 1, having in the said fuselage, a fuel tank in front of said wing and another fuel tank below the said jet pipes, the said two fuel tanks communicating with one another so as to attain balance in pitch of the aircraft at all fuel states.

6. A multi-purpose aircraft as claimed in claim 1, having a dorsal fin mounted on the said fuselage above the said twin pipes and having vertical spars taken right down through the said fuselage between the said twin jet pipes and structurally anchored to the said fuselage on top and bottom thereof.

References Cited in the file of this patent

UNITED STATES PATENTS

| | | |
|---|---|---|
| 2,726,671 | Zand et al. | Dec. 13, 1955 |
| 2,731,216 | Dillman | Jan. 17, 1956 |
| 2,744,698 | Baynes | May 8, 1956 |
| 2,920,842 | Decker et al. | Jan. 12, 1960 |
| 2,941,751 | Gagarin | June 21, 1960 |
| 2,944,764 | Lane | July 12, 1960 |
| 2,944,765 | Lane | July 12, 1960 |